(12) United States Patent
Messerschmidt et al.

(10) Patent No.: US 7,369,225 B2
(45) Date of Patent: May 6, 2008

(54) DEVICE AND METHOD FOR INSPECTING SURFACES IN THE INTERIOR OF HOLES

(75) Inventors: Bernhard Messerschmidt, Jena (DE); Karl Wisspeintner, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 11/608,489

(22) Filed: Dec. 8, 2006

(65) Prior Publication Data

US 2007/0086000 A1    Apr. 19, 2007

Related U.S. Application Data

(63) Continuation of application No. PCT/DE2005/000914, filed on May 17, 2005.

(30) Foreign Application Priority Data

Jun. 8, 2004    (DE) ............... 10 2004 027 758

(51) Int. Cl.
*G01N 21/88*    (2006.01)
*G01B 11/00*    (2006.01)

(52) U.S. Cl. ............... 356/241.1; 356/601; 356/4.01; 356/626; 359/654

(58) Field of Classification Search .. 356/241.1–241.6, 356/600–601; 250/201.4, 201.8, 216, 559.27, 250/227; 359/558, 565–566; 378/206, 63
See application file for complete search history.

(56) References Cited

U.S. PATENT DOCUMENTS

| | | | |
|---|---|---|---|
| 3,761,186 A | 9/1973 | Wason | |
| 4,557,798 A * | 12/1985 | Blanding et al. | 216/12 |
| 4,585,349 A | 4/1986 | Gross et al. | |
| 4,641,927 A * | 2/1987 | Prescott et al. | 359/654 |
| 4,766,305 A * | 8/1988 | Fahl | 250/216 |
| 4,767,924 A * | 8/1988 | Giebel et al. | 250/223 R |
| 4,791,293 A * | 12/1988 | Barriere | 250/302 |
| 5,165,063 A * | 11/1992 | Strater et al. | 356/4.01 |
| 5,177,779 A * | 1/1993 | Cornu et al. | 378/206 |
| 5,317,387 A * | 5/1994 | Van Hengel et al. | 356/625 |
| 5,785,651 A | 7/1998 | Kuhn et al. | |
| 6,208,465 B1 * | 3/2001 | Schaham | 359/558 |
| 6,462,815 B1 * | 10/2002 | Drabarek et al. | 356/241.1 |

FOREIGN PATENT DOCUMENTS

DE    102 42 374 A1    4/2004

OTHER PUBLICATIONS

Hasman et al., "Color-Coded Optical Profilometry with >106 Resolved Depth Steps" *Applied Optics*, Apr. 1, 2001, pp. 1609-1616.

* cited by examiner

*Primary Examiner*—Sang H. Nguyen
(74) *Attorney, Agent, or Firm*—Alston & Bird LLP

(57) ABSTRACT

A device and method for checking surfaces in the interior of holes, depressions, or the like. The device and method are developed in such a manner that a multicolor light beam can be produced with a light source, wherein a light beam, due to the chromatic aberration of the imaging optics, can be focused onto several points at different distances from the imaging optics, such that the distance to the surface can be determined from the spectrum of the detected light beam.

19 Claims, 2 Drawing Sheets

DEVICE AND METHOD FOR INSPECTING SURFACES IN THE INTERIOR OF HOLES

CROSS REFERENCE TO RELATED APPLICATION

The present application is a continuation of international application PCT/DE 2005/000914, filed 17 May 2005, and which designates the U.S. The disclosure of the referenced application is incorporated herein by reference.

BACKGROUND OF THE INVENTION

The invention relates to a device for inspecting surfaces in the interior of holes, recesses, or the like, where the device comprises a light source for producing a light beam, where the light beam can be focused by imaging optics, where the focused light beam can be deflected onto the surface, and where a sensor device is provided for detecting the reflected light beam.

Surface inspections in the interior of holes, recesses, or the like, in particular of boreholes or small cracks with dimensions in the millimeter range, represent an important task in many fields of technology. High quality and close-tolerance bore holes are frequently needed when they are provided to receive movable parts such as pins, cylinders, or small pistons, e.g. in pressure valves. Pressure valves are used in pneumatics but also in other fields such as in automobile technology for fuel injection. There in the meantime, test pins for electrical circuits with pneumatic cylinders with a diameter of 2 mm are finding application. These very small cylinders are necessary in order to keep up with electrical circuits which are constantly getting smaller. Close-tolerance bore holes are also required for shrink connections, where said bore holes cannot be allowed to be subject to damage due to burrs or bubbles. Moreover, it can also be of importance in holes outside of the millimeter range to know the surface quality precisely. Thus, for example, brake cylinders in a motor vehicle must have a particularly high-quality surface since small chips or burrs in the cylinders can lead to the destruction of the parts after even a short time.

For the inspection of surfaces, essentially two processes are used in practice at present. In one system a glass wedge forms optics with which nearly 360° of the surrounding surface can be imaged on a light wave guide bundle. The light wave guide bundle frequently comprises several thousand individual fibers which together conduct an image to a camera. By suitable image processing, structures on the surface can be recognized thereby. However, their actual size, in particular their three-dimensional extension, cannot be determined.

In another technology customary in practice, a monochromatic light beam is deflected onto the surface to be examined, where this light beam is always kept focused on the surface. If the distance between the optics and the illuminated image point changes as a consequence of unevenness of the surface and thus the light beam is no longer focused, then an automatic focusing circuit adjusts the optics in such a manner that the light beam is once again focused on the surface. Via this correction of the optics, the change in distance can be detected. In this way the surface can indeed be measured in three dimensions, but due to the necessary tracking of the focusing only relatively slow measurement speeds can be achieved. An inspection in a running production process thus cannot be realized.

The present invention is thus based on the objective of developing and extending a device of the type stated in the introduction in such a manner that, as far as possible, a rapid, simple, and reproducible inspection of surfaces in the interior of holes, recesses, or the like is possible with dimensioning up into the millimeter range and with the simplest construction. Furthermore, a corresponding process will be specified.

SUMMARY OF THE INVENTION

According to the invention, the above objectives and others are realized by providing a device for checking surfaces in the interior of holes or depressions, the device comprising a light source for generating a light beam, the light beam being able to be focused by an imaging optic, the focused light beam being deflectable onto a surface using a deflection device, and a sensor device being provided for detecting the light beam reflected from the surface, wherein a multicolor light beam may be generated using the light source, which is focused by chromatic aberration of the imaging optic onto multiple points at various distances from the imaging optic, and the distance to the surface is able to be ascertained from the spectrum of the detected light beam. According thereto, the device under discussion is developed in such a manner that a multicolor light beam can be produced with the light source, said light beam, due to the chromatic aberration of the imaging optics, being focused onto several points at different distances from the imaging optics, and that from the spectrum of the detected light beam the distance to the surface can be determined.

With regard to the process, the above objectives and others are realized by providing a method for checking surfaces in the interior of holes or depressions, the method comprising generating a light beam using a light source, focusing the light beam using an imaging optic, deflecting the focused light beam onto a surface using a deflection device, and detecting the reflected light beam, wherein generating the light beam comprises generating a multicolor light beam which is focused by chromatic aberration of the imaging optic onto multiple points at various distances from the imaging optic, and the distance to the surface is ascertained from the spectrum of the detected light beam. According thereto, the process under discussion is characterized by the fact that with the light source a multicolor light beam is produced which, due to the chromatic aberration of the imaging optics, is focused onto several points at different distances from the imaging optics, and that from the spectrum of the detected light beam the distance to the surface can be determined.

In the manner according to the invention it has first been recognized that the re-focusing of the optics can be omitted. Turning away from the process known in practice, multicolor light is intentionally used and, arising thereby and frequently undesirable, the chromatic aberration associated with multicolor light is exploited in the optics. Due to the chromatic aberration, light beams of different wave lengths are focused onto different focal points. Depending on the degree of chromatic aberration, these focal points lie in a more or less widely extended area and at a greater or lesser distance from the imaging optics on the optical axis of the imaging optics. Since those spectral fractions which are essentially focused on the illuminated point of the surface are reflected best by the irradiated surface, conclusions about the distance between the optics and the illuminated image point can be drawn according to the invention from a spectral analysis of the reflected light beam. If an entire area on the surface is scanned by deflecting the focused light beam, then a profile concerning the condition of the surface can be developed in this manner.

The device according to the invention and the process according to the invention can be used in an advantageous manner anywhere that surfaces have to be measured in surroundings which are very restricted spatially. Thus, for example, bore holes, but also depressions, cracks, or other recesses, can be measured.

According to the invention a multicolor light beam is produced for this purpose which is preferably conducted via one or more light wave guides to imaging optics. This is preferably white light since a particularly simple situation with regard to the evaluation of the spectral fractions results thereby. The imaging optics comprises in an advantageous manner a lens or a system of lenses.

With regard to a miniaturization which is as simple as possible and imaging optics which are as economical as possible, said imaging optics preferably comprise a GRIN (gradient index) lens. GRIN lenses usually consist of cylindrical blocks which are provided by special production processes with a continuous radial change in the index of refraction. In so doing, the same effects are obtained on a light beam passing through the lens as with conventional lenses. However, GRIN lenses can be miniaturized significantly further with lower production costs, which is of great advantage in particular in spatially restricted surroundings.

In a particularly advantageous manner the GRIN lens can be assigned to a positioning device, a so-called spacer, with which the aberration of the lens can be adapted. With this, a lens of this type can be adapted particularly simply to changed system configurations.

In measurement situations in which greater distances between the optics and the measured object must be overcome, the GRIN lens can be connected later to additional optics. Here, for example, imaging optics known in the case of aspheric telescopes can be used. In an advantageous manner, for example, a light wave guide can be coupled between the lenses of the telescope optics to deflect light into the beam path, whereby still greater coverage is possible.

With regard to a particularly simple deflectability of the focused light beam, a deflecting device could be provided which preferably is structured in such a manner that it can be moved. In this connection, prisms, mirrors, or also plane-parallel plates are used. Advantageously the deflecting device is adapted to achieve reproducible measurement processes through electrical, piezoelectric, magnetic, or comparable positioning elements, which preferably are driven by an electronic circuit, e.g. a microcontroller. By suitable control of the deflecting device the entire surface, or at least a part of the surface, in the interior of a hole, specifically the part to be inspected, can be illuminated and measured. In so doing, the light beam can be guided in a linear, circular, spiral, meandering, or any other suitable manner.

With regard to a particularly simple and space-saving development of the device, the reflected light beam could take the same path as the light beam produced by the light source, only in the reverse direction. At a suitable point the reflected light beam could be separated by an optical separating filter and conducted to a sensor device.

The sensor device advantageously comprises an electronic component which is in the position to convert multicolor light, depending on the spectrum of the incident light beam, into suitable electrical signals. Preferably, a CCD chip or other photodetector arrays are used here.

The device according to the invention can be operated in a relatively simple manner as a multi-channel system, whereby several measurements can be carried out simultaneously. In so doing, the light exiting from the imaging optics can be divided onto several measurement points and the respective reflections of the measurement points conducted via, preferably several, light wave guides. In a particularly advantageous manner when so doing, the measurement points are disposed depending on the measurement situation. Here a disposition in the form of a row and a circle would be conceivable.

With regard to a particularly versatile evaluation capability of the signals obtained by the sensor device, they could be conducted to an electronic device which, for example, comprises a digital computer in the form of a microcontroller or a digital signal processor. With this, signal processing can be carried out and the data obtained prepared in a suitable manner for later use, e.g. a visualization. Perhaps evaluation of measurement results could also be done here and the surface classified according to certain criteria.

BRIEF DESCRIPTION OF THE DRAWINGS

Figure 1:
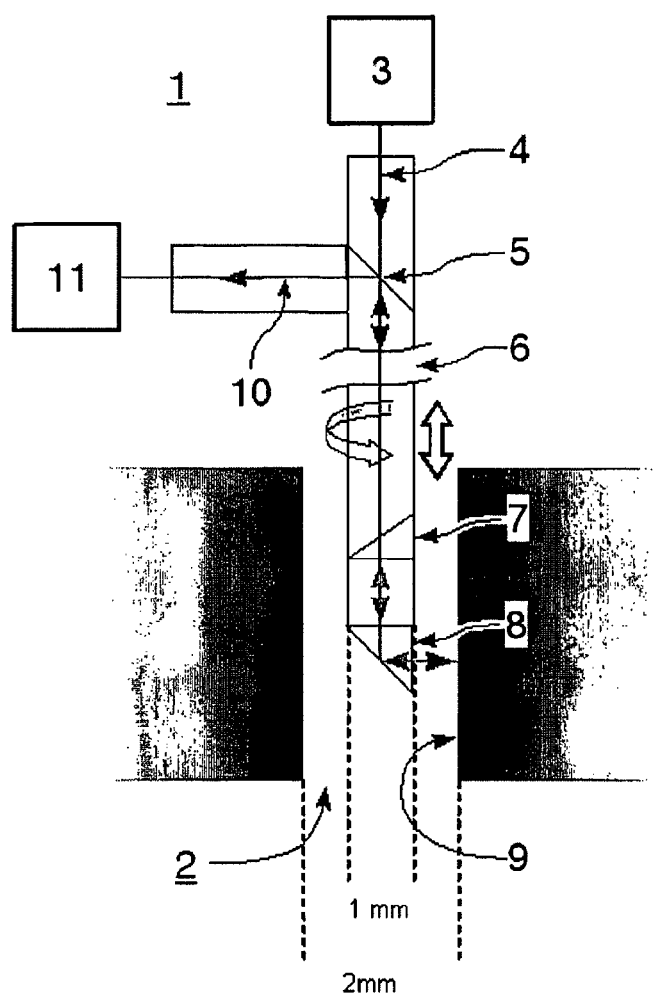
Figure 2:
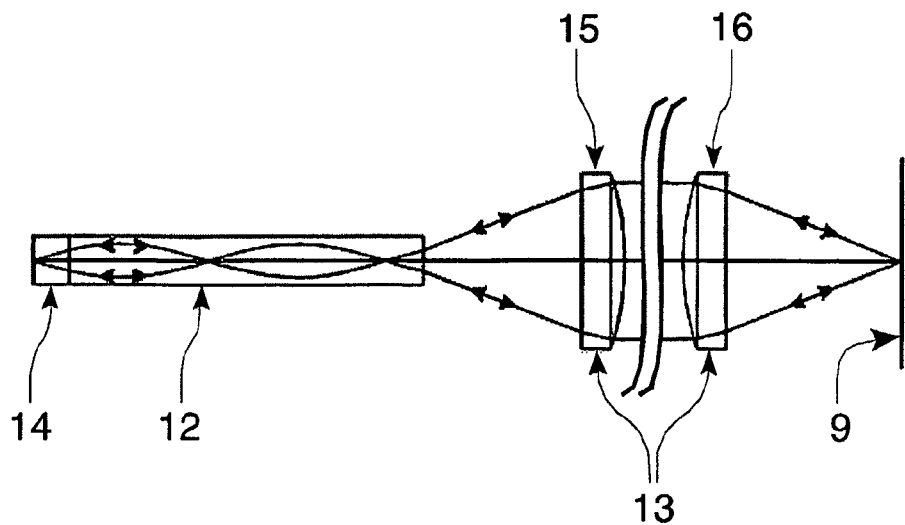
Figure 3:
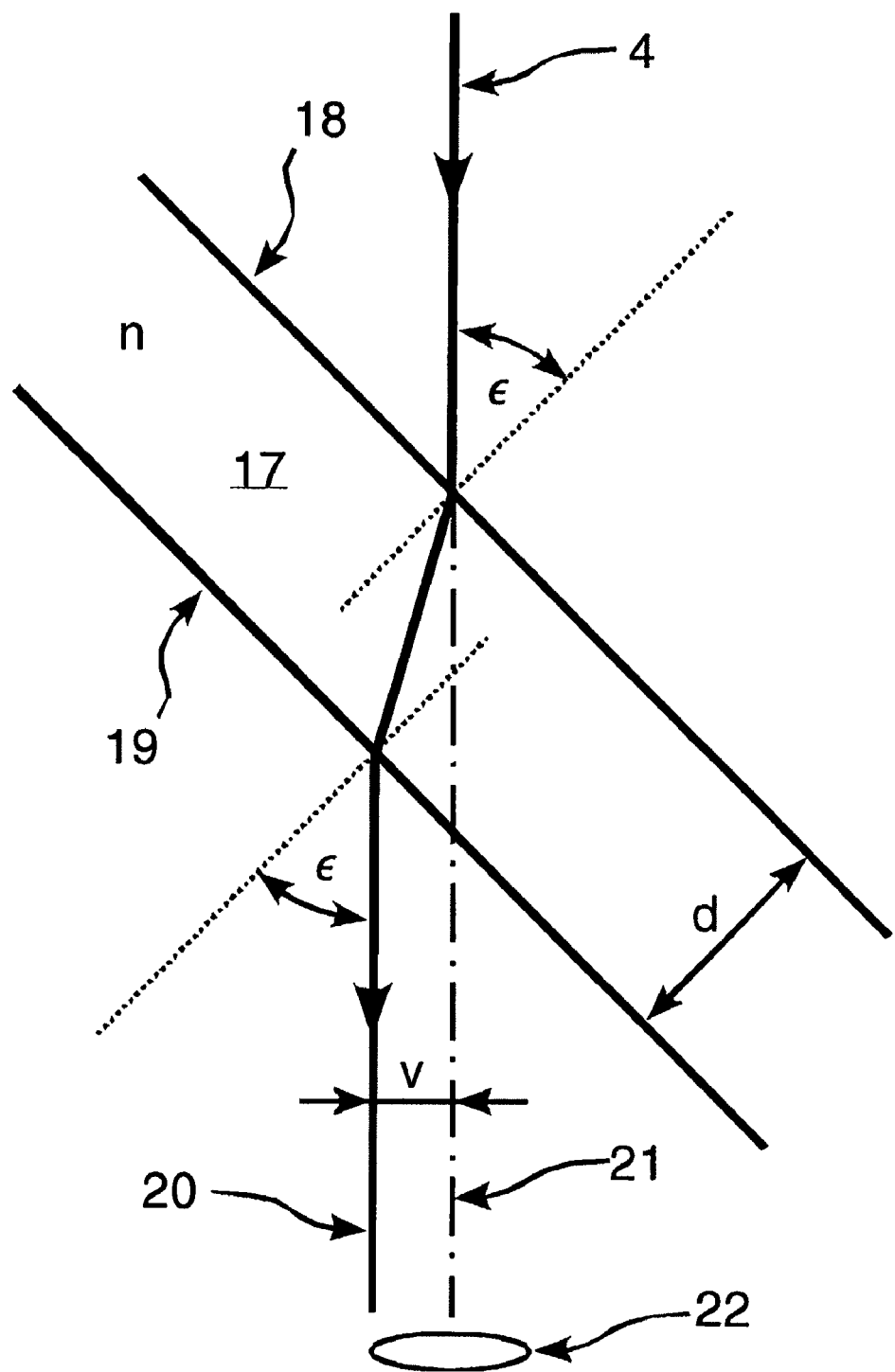

Having thus described the invention in general terms, reference will now be made to the accompanying drawings, which are not necessarily drawn to scale, and wherein:

FIG. 1 shows in a schematic view a conceptual layout of a device according to one embodiment of the invention;

FIG. 2 shows in a schematic view the use of a GRIN lens in connection with a lens system; and FIG. 3 shows in a schematic view a deflecting device with a plane-parallel plate.

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

FIG. 1 shows in a schematic representation a conceptual layout of a device 1 according to the invention for inspecting the surface 9 in the interior of a hole 2. The device 1 comprises a light source 3 with the aid of which a multicolor light beam 4 can be produced. This light beam 4 passes unaffected through an optical separating filter 5 and is coupled into a light wave guide 6 to deflect the light beam 4. The light beam 4 is focused, with a lens system 7 using its chromatic aberration, onto a series of focal points and is deflected with a deflecting part 8 onto the surface 9 of the hole 2. The lens system 7 and the deflecting part 8 are coordinated with one another in such a manner that at least one of the focal points lies on the surface 9. Under certain circumstances a corresponding adaptation device, not represented here, may be provided so that this requirement can be met. The optical system comprising the lens system 7 and deflecting part 8 is mounted in such a manner that it can turn and can be moved along the longitudinal axis of the hole 2. These movements are preferably carried out via an electrical positioning device not represented here so that the surface 9 of the hole 2 can be scanned as completely and reproducibly as possible.

On the surface 9 the light beam is reflected and conducted via the deflecting wedge 8 and the lens system 7 to the light wave guide 6. The optical separating filter separates the light beam 4 produced by the light source 3 from the reflected light beam 10 which is conducted to the sensor device 11. This sensor device is coupled to evaluation electronics, also not represented, which calculates from the spectrum of the reflected light beam 10 the distance between the device 1 according to the invention and the surface 9 and makes the data available for a later evaluation and/or visualization.

In FIG. 2 the use of a GRIN lens 12 with conventional optics 13 is represented in a schematic view. In the drawing an approximately 1.0 pitch GRIN lens 12 is represented, that is, the lens is dimensioned in such a manner that an incident light beam describes a period of a sinusoidal oscillation in the interior of the GRIN lens 12. To adjust the chromatic aberration, the GRIN lens 12 is connected at the front to a positioning device 14, a so-called spacer.

The light beam exiting from the GRIN lens 12 is conducted by optics 13, which is preferably formed by 1:1 imaging optics with two aspheric lenses, such imaging optics being known in aspheric telescopes. Between the two lenses 15 and 16 a light wave guide not represented here can be disposed to bridge still greater distances. The light beam exiting from the optics is conducted to the surface 9, under certain circumstances with the use of a deflecting device 8.

FIG. 3 shows a development of the deflecting device 8 by a plane-parallel plate 17. The incident light beam 4 is refracted at each of the two boundary surface 18 and 19, whereby a shifted, parallel light beam 20 results. The shift v follows from the thickness d of the plate 17, the angle $\epsilon$ between the incident light beam 4 and the perpendicular to the plate 17, and the index of refraction n. If the plane-parallel plate 17 is rotated about the axis 21, then the shifted, parallel light beam 20 describes a circular path on the surface to be examined. If, in addition, the inclination of the plane-parallel plate 17 is varied, surfaces can be scanned in an annular pattern.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A device for checking surfaces in the interior of holes or depressions, the device comprising:
   a light source for generating a light beam, the light beam being able to be focused by an imaging optic comprising a gradient index lens, the focused light beam being deflectable onto a surface using a deflection device; and
   a sensor device for detecting the light beam reflected from the surface,
   wherein a multicolor light beam is generated using the light source, which is focused by chromatic aberration of the imaging optic onto multiple points at various distances from the imaging optic, and the distance to the surface is able to be ascertained from the spectrum of the detected light beam, and wherein the gradient index lens is connected before additional optics such that a greater distance between the gradient index lens and the surface to be measured can be achieved, or a coupling of the light beams exiting from the gradient index lens into a light wave guide is possible.

2. The device according to claim 1, wherein the multicolor light beam produced by the light source is a polychromatic light beam.

3. The device according to claim 2, wherein the polychromatic light beam comprises white light.

4. The device according to claim 1, wherein the light beam is conducted from the light source by one or more light wave guides to the imaging optic.

5. The device according to claim 1, wherein the imaging optic comprises at least one of a lens or a system of lenses.

6. The device according to claim 1, wherein the gradient index lens can be adapted in its aberration by a positioning device.

7. The device according to claim 1, wherein the focused light beam is deflected by a deflecting device to a certain point on the surface.

8. The device according to claim 7, wherein the deflecting device is structured in such a manner that it can move.

9. The device according to claim 7, wherein the deflecting device can be moved by at least one of electrical, piezoelectric, or magnetic positioning devices.

10. The device according to claim 7, wherein the deflecting device comprises at least one of a prism, a plane-parallel plate, a mirror, or another device configured to affect the direction of propagation of the light beams.

11. The device according to claim 1, wherein the light beam produced by the light source and the light beam reflected from the surface are separated by an optical separating filter.

12. The device according to claim 1, wherein the sensor device comprises a photodetector array.

13. The device according to claim 12, wherein the photodetector array comprises a linear array.

14. The device according to claim 1, wherein the device is constructed as a multi-channel system, and whereby several measurements can be carried out simultaneously.

15. The device according to claim 1, wherein the light exiting from the imaging optic can be divided onto several measurement points and the reflections of the measurement points can be conducted via several light wave guides to the sensor device.

16. The device according to claim 1, wherein signals produced by the sensor device are conducted to an electronic device.

17. The device according to claim 16, wherein the electronic device comprises at least one of a digital computer in the form of a microcontroller or a digital signal processor for signal processing.

18. A method for checking surfaces in the interior of holes or depressions, the method comprising:
   generating a light beam using a light source;
   focusing the light beam using an imaging optic comprising a gradient index lens;
   deflecting the focused light beam onto a surface using a deflection device; and
   detecting the reflected light beam,
   wherein generating the light beam comprises generating a multicolor light beam which is focused by chromatic aberration of the imaging optic onto multiple points at various distances from the imaging optic, and the distance to the surface is ascertained from the spectrum of the detected light beam, and wherein the gradient index lens is connected before additional optics such that a greater distance between the gradient index lens and the surface to be measured can be achieved, or a coupling of the light beams exiting from the gradient index lens into a light wave guide is possible.

19. The method according to claim 18, further comprising scanning the surface by guiding the light beam using the deflecting device in at least one of a linear, circular, spiral, meandering, or any other suitable manner over the surface.

* * * * *